United States Patent
Nowell et al.

[15] 3,662,967
[45] May 16, 1972

[54] LEVEL WINDER AND TENSIONER

[72] Inventors: Charles P. Nowell, 7305 El, Buena Park, Calif. 90620; Aubry S. Nowell, 8320 Felicidad, Anaheim, Calif. 92801

[22] Filed: July 1, 1970

[21] Appl. No.: 51,510

[52] U.S. Cl. .............................. 242/54, 242/157, 254/190
[51] Int. Cl. .................................................. B65h 75/00
[58] Field of Search .............. 242/54, 67.2, 67.3, 128, 129.5, 242/129.62, 157; 254/150, 190

[56] References Cited

UNITED STATES PATENTS

| | | | |
|---|---|---|---|
| 2,668,673 | 2/1954 | Clotworthy, Jr. | 242/54 R |
| 3,224,697 | 12/1965 | Struble, Jr. | 242/54 R |

*Primary Examiner*—Leonard D. Christian
*Attorney*—Allen A. Dicke, Jr.

[57] ABSTRACT

Between a drum and a pulley which feeds cable to the drum, the level winder is positioned to place an axial stress on the cable so that the cable naturally level-winds. The level winder is a bulbous guide which converts cable tension to axial force as related to the axial position of winding on the drum. A tensioner at the guide pulley maintains tension on the level winder, even when the outer end of the cable is slack, so that level winding proceeds.

8 Claims, 6 Drawing Figures

Patented May 16, 1972
3,662,967
2 Sheets-Sheet 1
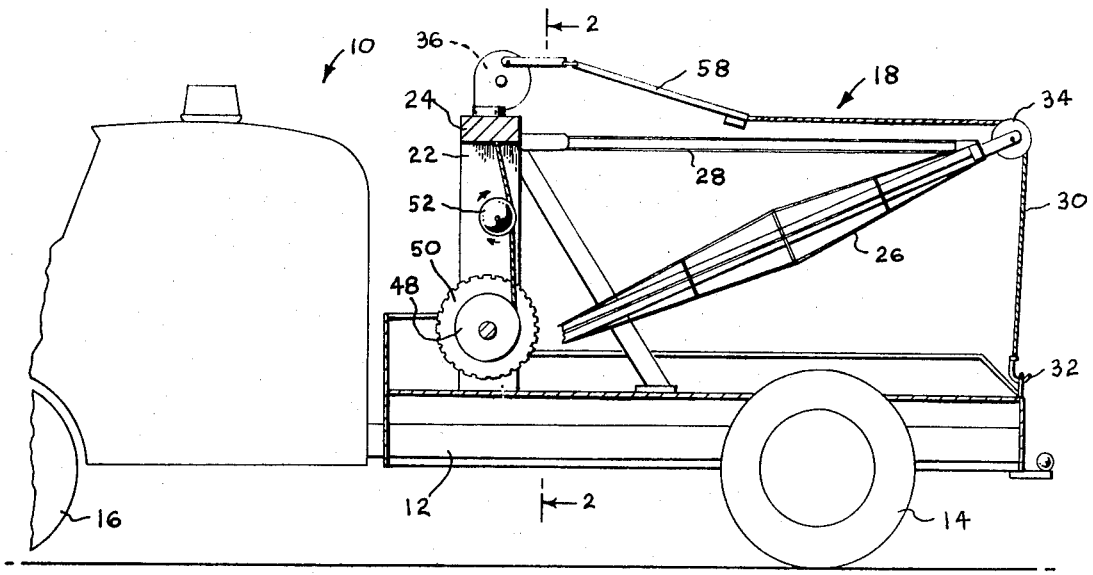
fig_1
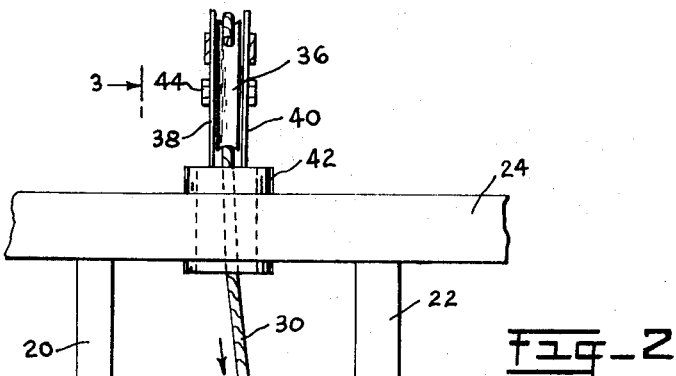
fig_2
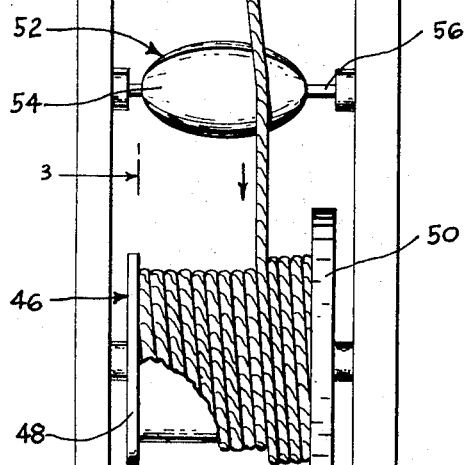
INVENTORS;
CHARLES P. NOWELL,
AUBRY S. NOWELL
BY
ALLEN A. DICKE, JR.,
AGENT

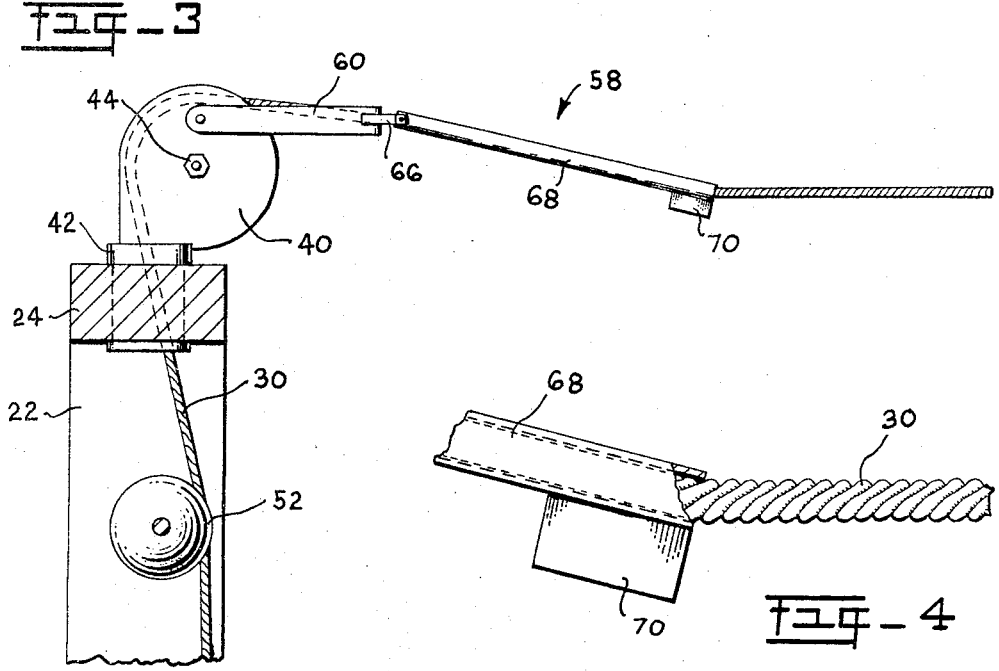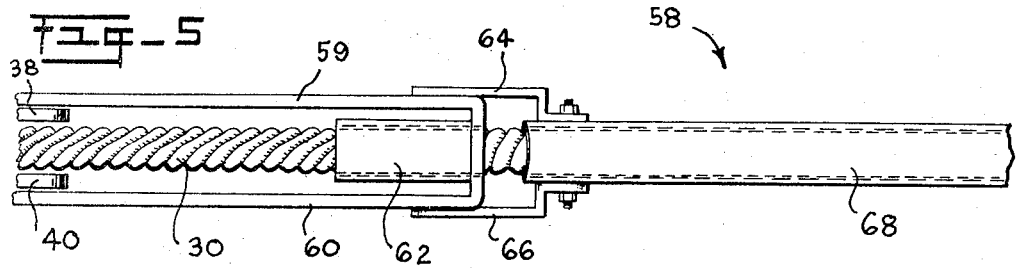

LEVEL WINDER AND TENSIONER

BACKGROUND

This invention is directed to a level winder for cable drums and to its tensioning means to provide the necessary level winder tension.

Level winding of hoist cable is essential to an adequate cable life and strength. When cable becomes cross-wound on the drum and the drum and cable are used for pulling heavy loads, the cross-wound cable is damaged so that, on a later pull, it does not have its rated tensile strength. This has long been known, and level winders of complex nature have been employed to solve the problem. The best known and principally used level winder is a winder in which a cable guide is forcibly moved axially of the drum as the drum rotates. An appropriate screw is driven by drum rotation and the level winder guide is carried along the screw. This structure is necessarily complex, because it requires the screw and its bearing mountings, the screw drive from the drum and the mounting of the cable guide upon the screw and frame. Such has been effective, because it has been the only available positive level winding structure.

In that status, it has been the only effective way of obtaining level winding, in the absence of special considerations. These special considerations comprise the cases where the feed pulley can be employed at a long distance away from the winding drum. In this case, the winding drum can have a helical guide groove cut in the surface thereof, so that the first layer of the cable is smoothly wound in place under guidance by the helical groove. At the end of the first layer, the cable is adjacent to an end flange of the drum, and the cable winds to the second layer. In that layer each turn thrusts the next turn forwards as it lays to result in level winding. Of course, axial forces from a guide pulley will upset this natural level winding. Thus, this natural method is operative only where the guide pulley next adjacent the drum is practically an infinite distance away.

Such a circumstance is not normally available in equipment which must be of smaller size, such as in wrecking trucks and like structures. Wherever portability is desired, as compared to the long lifts of many overhead cranes, the short distances between the guide pulley and the winding drum demand employment of a level winding mechanism.

SUMMARY

In order to aid in the understanding of this invention, it can be stated in essentially summary form that it is directed to a level winder. The level winder comprises a bulbous guide mounted between the cable drum and its feed pulley, with the bulbous guide being contacted by the cable between the feed pulley and the drum. The contact surface of the bulbous guide is such that it exerts a force on the cable axially of the winding drum which force is related to the axial position of the cable so that level winding ensues.

The invention is also and separately directed to a tensioner which maintains the level winder operative and maintains tension on the winding drum in the absence of cable tension at the hook ends.

The tensioner provides cable tension, when the hook load drops below a reasonable value. The cable tensioner comprises a pivoted guide through which the cable passes so that the pivoted guide gravitationally descends upon low cable tension to provide a friction-producing bend in the cable.

Accordingly, it is an object of this invention to provide a simple level winding mechanism for a cable drum so that level cable winding cna be accomplished with a minimum of expense and complexity. It is a further object to porivde a level winder for a cable drum which is free of drum-driven guides. It is a further object to provide a level winder which is comprised of s cable guide positioned between the feed pulley and winding drum, with the guide providing axial force of varying amounts at different axial positions, in order to provide for level winding of the cable. It is a further object to provide a curved guide which is contacted by the cable between a feed pulley and a cable drum, with the curved guide providing axial force of an appropriate amount to level wind the cable upon the drum.

It is still another and separate object to provide a tensioner in connection with the level winder and cable drum so that the tensioner provides adequate tension for level winding, even when the hook end of the cable is free of loads. It is a further object to provide a tensioner which is comprised of a pivoted cable guide which gravitationally swings downward upon decreasing cable tension to provide a bend in the cable where it enters the guide. It is another object to provide a pivoted cable guide through which the cable passes and which swings downward upon decrease in cable tension, to provide a bend in the cable between the pivoted guide and a fixed member.

Other objects and advantages of this invention will become apparent from the study of the following portion of the specification, the claims and the a attached drawings.

BRIEF DESCRIPTION OF THE DRAWINGS

FIG. 1 is a schematic side elevational view, with parts broken away, and taken partly in vertical section, of a wrecking truck employing the level winder and cable tensioner of this invention thereon.

FIG. 2 is an enlarged partial elevational view taken generally along the line 2—2 of FIG 1.

FIG. 3 is a partial sectional view taken generally along the line 3—3 of FIG. 2.

FIG. 4 is a further enlarged fractional view, with parts broken away, showing the outer end of the cable tensioner.

FIG. 5 is a fractional top-plan view, with parts broken away, of the cable tensioner of this invention.

FIG. 6 is a side elevational view of the structure of FIG. 5, with parts broken away.

DESCRIPTION OF THE PREFERRED EMBODIMENTS

A wrecking truck 10 is illustrated in FIG. 1 as being a particularly useful application for the level winder and tensioner of this invention. The wrecking truck provides a structure in which the cable is wound on a drum, in which cable may be ordinarily wound with inadequate tension for proper winding and cable maintainance on the drum. Thus, the wrecking truck serves as an exemplary device on which this invention can be employed. Wrecking truck 10 has its frame 12 which is mounted for propulsion on rear wheels 14 and steering upon front wheels 16, as in conventional trucks. Upon frame 12 is mounted winch and boom assembly 18.

Winch and boom assembly 18 comprises uprights 20 and 22 with a top crossmember 24 extending transversely across the top thereof. Conventionally two booms are provided upon wrecking trucks wuch as the one illustrated at 10. One of these booms is indicated at 26 and is pivoted adjacent the bottom of upright 22. Radius arm 28 is a tension member between cross member 24 and the end of the boom. The radius arm 28 may be of adjustable length, if desired, as may be the boom 26. The two booms are normally secured together at their outer ends to act as a single lifting point at the rear of the truck. However, for special purposes, they can be detached at their outer ends and independently swung to one side or the other. It is for this reason that both the radius arm 28 and the boom 26 are pivoted at their inner ends.

Lifting is accomplished by cable 30 which has a hook 32 or other attachment device at its outer ends. Cable 30 passes over boom pulley 34 which is rotatably mounted on the outer end of boom 26 and over guide pulley 36.

Guide pulley 36 is rotatably mounted between side plates 38 and 40 which are, in turn, mounted for rotation on a vertical axis in bearing 42. Pivot pin 44 rotatably carries guide pulley 36 between the side plates and, as is seen in FIG. 3, pivot pin 44 is rearwardly positioned from the vertical axis through bearing 42. Thus, guide pulley 36 operates as a caster so that, when under tension, it is always directed toward the source of cable tension. This source is normally boom pulley 34. This construction permits boom 26 with its pulley 34 to be swung to the side and guide pulley 36 follows to carry the cable in the correct direction.

Conventionally, the winch and boom assembly 18 has a winch 46 which includes a drum 48 upon which cable 30 is wound. Drum 48 is rotatably mounted between uprights 20 and 22 and has drive means 50 connected thereto to rotate the drum. Drive means 50 can be any conventional winch drive means, including a reduction geared electric motor, power takeoff from the main engine of wrecking truck 10, or a hydraulic pump-reservoir-motor combination. Thus, any conventional drive means can be employed for rotation of the winch drum.

Conventionally, guide pulley 36 is positioned to direct the cable 30 toward the center of drum 48. In those winch installations where the guide pulley is sufficiently far from the drum that the angle subtended from the guide pulley to the winch drum end flanges is less thant the lead of the cable level winding on the drum, natural level winding can be accomplished. However, in wrecking trucks, the normal low height of crossbar 24 prevents natural level winding with a drum having a reasonable dimension between the end flanges. Thus, in order to be fully effective and to prevent cross winding, level winder 52 is provided.

Level winder 52 comprises a curved surface 54 which extends in a direction such as to deflect the cable 30 from its straight course from guide pulley 36 to winch 46, and to deflect it in such a manner that it approaches the winch drum sufficiently within a plane normal to the drum axis that what appears as natural level winding is accomplished. In other words, the shape of the surface 54 over which cable 30 passes applies an axial stress (axial of the winch drum axis) sufficient to neutralize the axial stress due to the angle of the cable caused by the fact that pulley 36 is centrally located and spaced a short distance from the drum, as compared to be infinitely far away.

The shape of surface 54 is related to the sine of the angle of cable 30 between guide pulley 36 and surface 54, although the exact shape of surface 54 is dependent upon how far it deflects cable 30 out of the shortest path. The preferred structure of level winder 52 is illustrated as being a bulbous, football-like shape. It is rotatably mounted upon a shaft 56 which holds level winder 52 in position, where the ends of curved surface 54 are substantially in line with the flanges on drum 48. The purpose of having the level winder a solid of revolution mounted upon a shaft is to permit rotation, which reduces wear on both the cable and on the level winder.

Presuming the cable 30 is completely unwound from drum 46 and the cable 30 is secured to the drum surface adjacent one of the drum flanges, and presuming tension in the cable 30, winding of the cable starts at the flange where the cable is secured. In the absence of level winder 52, the angle enforced by guide pulley 36 upon cable 30 would cause the cable to wind upon the drum with a greated lead angle than the tight winding of one cable turn against the next. However, with the surface 54 interposed between, the angle of the surface is related to the displacement of the cable between guide pulley 36 and the winch drum surface causes the cable 30 to be fed directly straight onto the winch drum. Thus, the previous turn of the cable forces the cable to wind ahead in a continuous abutting helix. This continues with surface 54 changing as the cable winds axially upon the winch drum all the way to the other drum flange. At the second drum flange, the second wrap starts. Again, the first full turn forces the second wrap ahead so that a new helix starts in the opposite direction. This continues in proper level winding operation until winding is complete.

In order to accomplish this level winding and to prevent the cable from springing loose upon the drum after it is wound, cable tensioning is necessary. Cable tensioner 58 is best illustrated in FIGS. 1 and 3 through 6. Side plates 38 and 40 of guide pulley 36 carry guide arms 58 and 60. These guide arms may be rigidly secured thereto or may be pivoted so that they can swing up or down in accordance with the direction of cable tension. They are illustrated as being firmly fixed, in the present case. Guide arms 58 and 60 are joined at their outer end and carry therein guide tube 62. Guide tube 62 has an opening therethrough of sufficient size to fairly closely pass cable 30.

Brackets 64 and 66 are respectively secured to the outer ends of guide arms 58 and 60. Brackets 64 and 66 pivotally carry tension tube 68 thereon. The pivotal axis of the tension tube on the brackets is horizontal, so that the tension tube is gravitationally swung downward upon reduction in tension in cable 30. Weight 70 can be optionally installed on the outer end of tension tube 68 to aid in this action.

Tension tube 68 is tubular, with the opening therethrough only slightly larger than the cable in diameter. Thus, when tension is reduced on cable 30, it naturally forms curvature along the length thereof, such curvature being the result of manufacture and winding around pulleys. This curvature engages upon the inner surfaces of tension tube 68 to increase the cable friction to prevent the cable from passing through. Thus, undertension at the drum is prevented.

Another feature of this design also prevents further decrease in tension. Tension tube 68 extends rearwardly, toward guide 62 from the pivot point of tension tube 68 on its brackets 64 and 66. This causes slight kinking of the cable 30 between tension tube 68 and guide 62 as the tension tube 68 gravitationally drops. This is shown enlarged for the purpose of illustration in FIG. 6. Thus, adequate tension is maintained on the cable to prevent it from springing loose on the drum and to maintain adequate tension for the level winder 52 to satisfactorily operate.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A winch assembly having a level winder, said winch assembly with level winder comprising:
   a frame;
   a winch drum rotatably mounted on said frame on an axis and having a substantially cylindrical surface with respect to said axis and having first and second end flanges perpendicular to said axis so that cable can be wound on said drum surface between said flanges;
   a guide pulley for guiding cable to be wound upon said winch drum, said guide pulley and said drum surface defining a plane; and
   a level winder positioned between said guide pulley and said drum for engaging a cable, said level winder having a curved surface upon which said cable engages, said curved surface being axially fixed and thrusting said cable out of said plane and applying an axial force to said cable substantially equal to any axial forces imposed on said cable by said guide pulley so that said cable winds onto said drum from said level winder substantially parallel to a plane perpendicular to said axis.

2. The level winder of claim 1 wherein said curved surface is a surface of revolution about an axis, said level winder being rotatably mounted on said frame.

3. The level winder of claim 2 wherein said surfaces of revolution is substantially a prolate spheroid.

4. The level winder of claim 1 wherein a cable tensioner is secured with respect to said guide pulley so that tension is maintained on said cable as it is wound over said level winder.

5. The level winder of claim 4 wherein said cable tensioner comprises a tension tube pivotally mounted on said guide pulley, said tension tube having an opening therethrough and said cable passing through said opening, said tension tube swinging downward under gravitational force upon reduction in cable tension to apply drag to said cable.

6. The level winder of claim 5 wherein a guide is secured to said guide pulley adjacent said tension tube, said cable passing through said guide, said tension tube being pivoted so that, as it descends, it causes a kink in said cable between said tension tube and said guide to maintain cable tension.

7. The level winder of claim 3 wherein a tension tube is pivotally mounted on said guide pulley, said tension tube having an opening therethrough and said cable passing through said opening, said tension tube swinging downward under gravitational force upon reduction in cable tension to apply drag to said cable.

8. The level winder of claim 7 wherein a guide is secured to said guide pulley adjacent said tension tube, said cable passing through said guide, said tension tube being pivoted so that, as it descends, it causes a kink in said cable between said tension tube and said guide to maintain cable tension.

* * * * *